INVENTOR.
Eldridge R. Boyle, Jr.
BY Brown and Mikulka
and
William D. Roberson
ATTORNEYS United States Patent Office 3,429,243
Patented Feb. 25, 1969

3,429,243
EXPOSURE VALUE COMPENSATOR
Eldridge R. Boyle, Jr., Charlottesville, Va., assignor to Polaroid Corporation, Cambridge, Mass., a corporation of Delaware
Filed Aug. 16, 1965, Ser. No. 479,892
U.S. Cl. 95—10                    14 Claims
Int. Cl. G01j 1/22

ABSTRACT OF THE DISCLOSURE

An instrument for predicting photographic exposure effects by which all significant highlights in a field of view may be detected and compared against a luminous background representing the integrated intensity of illumination. The comparison is made using a photometric comparator which causes a superposition of integrated, diffused scene light over image light deriving from the same scene. Exposure correction factors are readily derived from the photocomparator.

---

This invention relates to vernier-like instruments for use in predicting photographic exposure effects and more particularly to devices for determining exposure value compensation factors, taking into consideration the effects of contrasting levels of luminance in a field of a view to be photographed.

In effecting a photographic exposure, a photographer generally has a certain range of exposure values from which to select. The range of these exposure values depends upon the latitude of the photosensitive emulsion within which the image is to be produced. The latitude of a photosensitive emulsion may be considered as that range of exposures within which the emulsion will produce a negative or positive of satisfactory quality. In photographing a typical field of view including objects and surfaces having varying degrees of luminance, the resulting photographic print customarily exhibits discrete areas which because of their brightness have been overexposed and other areas which because of their relative darkness have been underexposed. Most acceptable prints in fact contain many such highlights and darkened areas in addition to a range of intermediate tonal values.

The acceptability of a particular photographic print is not determined objectively by the number of highlights and darkened areas or by the proportionate areas of the print occupied by highlights and darkened areas. Instead, a print is usually judged as to its acceptability on a subjective basis. The determining factor in judging the correctness of a particular exposure is generally whether the psychologically significant areas of the photographic print have been correctly exposed to show significant details. Except in special types of artistic photography, the overall tonality of a photograph is relatively unimportant, if significant details within the field of view, such as the face of a principal subject in the photograph, have been obscured by overexposure or underexposure.

Not only is the photographer concerned with variations in contrast and tonal distribution, but he is affected by psychological factors involving his perception of the scene and his intention in making the picture. These subjective factors cannot be dismissed as merely theoretical or perfectionistic.

Nevertheless, the determination of exposure factors by objective physical measurements of the overall integrated reflected light from the scene to be photographed is widely employed. Many types of instruments functioning on different principles are available for the measurement of integrated scene light and for converting the measurement into exposure factors settable on a camera. The relevance of this type of measurement to the production of a photographic print pleasing to the photographer is based upon the assumption of the presence of a more or less typical range and distribution of tonal values within the scene to be photographed. The acceptability of a print based upon such determinations thus involves considerable dependence on probability. Although the proportion of acceptable prints producible based upon such purely objective measurements may be high, conspicuous failures do occur. The percentage of successful prints obtainable falls rather rapidly as the standards for acceptance are raised.

Various mechanical and electrical expedients have been proposed to adjust exposure values for a typical conditions. The most familiar technique of compensation is the application of the photographer's personal art based upon his analysis of the exposure situation. The production of pleasing and acceptable photographic prints, however, is an inherently complex problem, especially in any atypical situation, as common experience indicates. Even highly skilled photographers often resort to "bracketing," that is, making several exposures of the same scene at different exposure values each time, in order to obtain at least one acceptable print.

The use of a so-called "spot meter" of the visual comparison or photoelectric type with exposure factor determinations based mainly on selected highlights might seem an excellent solution. However, the time, patience and experience required to successfully master the use of such spot meters have proved to be serious obstacles to the general use thereof. Nevertheless, because of the psychological factor involved in producing adequate exposures of particular fields of view, it seems clear that the photographer must participate directly in the process of determining exposure factors if his efforts at photography are to achieve a high probability of success.

It is an object of this invention to provide an improved optical device for use in predicting exposure effects and in determining the degree of correction which should be made in an exposure factor in order to effect an exposure which will produce a psychologically acceptable photographic print.

A further object of the invention is the provision of a novel instrument for the prediction and determination of exposure effects of such simple construction that it may effectively be used by comparatively inexperienced photographers to produce highly acceptable photographic prints.

A further and more particular object of the invention is the provision of a new, improved and uncomplicated exposure effect predicting instrument by means of which all significant highlights in a field of view may be instantaneously and simultaneously compared with the integrated intensity of illumination over the same field of view to determine an exposure correction factor.

By way of a brief summary of one embodiment of this invention, a special viewing device is provided for presenting a field of view to be photographed for visual inspection by the photographer. The viewing device can be incorporated in a camera viewfinder housing or it may be provided as an entirely separate unit secured or not by means such as an accessory clip on the camera. Within the viewing device is positioned a partially transparent screen which may take many different forms. The screen intercepts the image transmission channel of the viewing device and produces the effect of a field of generalized illumination extending over the entire area of the field of view. The screen is illuminated evenly by integrated light derived from the same field or view inspected through the viewing device. The integrated light transmission channel which illuminates the screen evenly may be separate from the image transmission channel or coincident therewith.

The instrument includes a single control member, preferably calibrated in plus and minus exposure units. This control member is connected to a variable attenuation device such as an iris diaphragm or relatively adjustable polarizing element. When the scene is viewed through the device, the quality of the image presented is such that all areas in the field of view which are so bright as to be rendered over-exposed or without significant gradation in the final photographic print are given a distinctive or characteristic appearance as contrasted with the integrated illumination which veils the field of view. Highlight areas are particularly visible in contrast with the integrated illumination.

The photographer observing the scene can readily determine whether significant highlight areas in which gradation is desired would be washed out or not in a photographic print. If no such areas are indicated as sufficiently bright to produce overexposure in the final print it will generally be apparent that the resulting print would be too dark unless this should be the effect desired. The control member is adjusted to vary the quality of the image presented for visual inspection. When the instrument is adjusted to the point that psychologically significant areas within the field of view are not completely veiled by the illuminated, partially transparent screen within the instrument and do not completely dominate the image viewed therethrough, the exposure correction factor indicated on the instrument may be applied to the exposure setting of the camera. It will be clear that if the device is built into the camera or even held securely in a camera accessory clip or otherwise, the compensation control can be coupled directly to the exposure control settings of the camera, thus simplifying the operation for the user.

Although the scope of this invention is not to be limited except by the claims appended hereto, further details of the invention as well as additional objects and advantages thereof will be more readily preceived in the following detailed description taken together with the accompanying drawings wherein:

Figure 1:
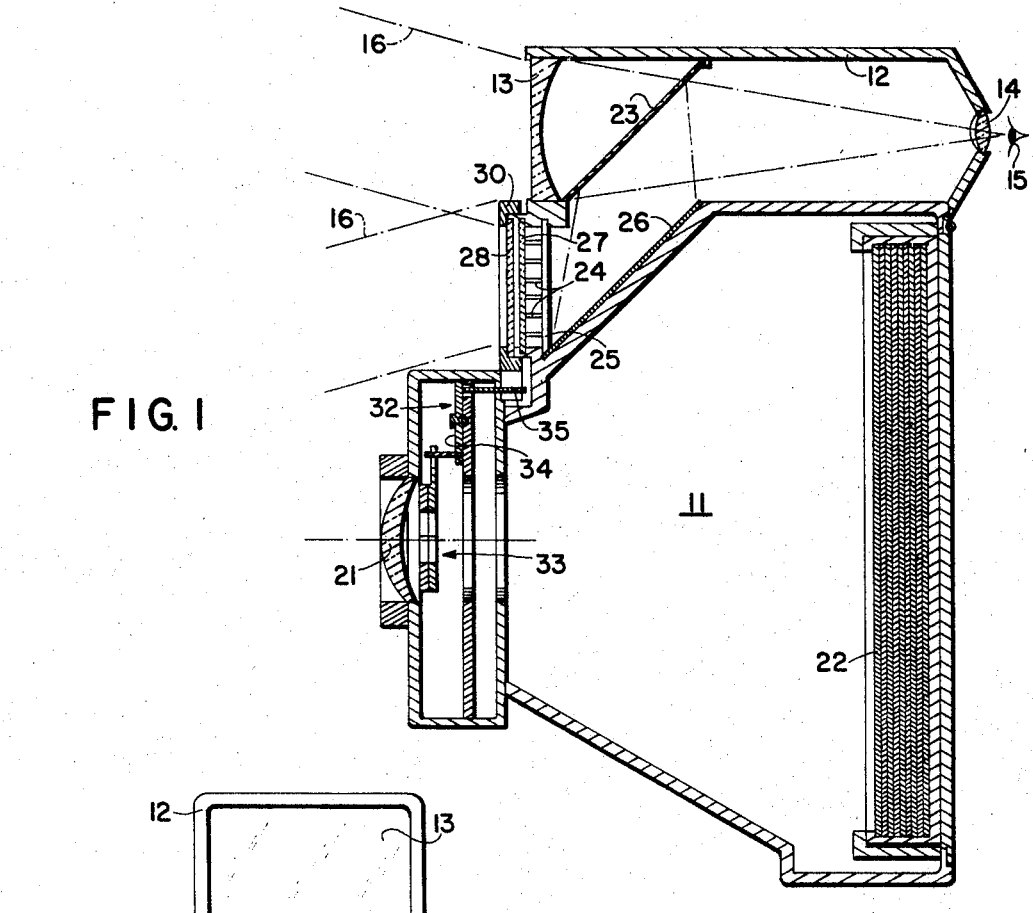
FIGURE 1 is a diagrammatic cross sectional view of a camera equipped with an exposure value vernier instrument constructed in accordance with this invention.

In FIGURE 1 is shown a cross sectional view of a camera equipped with an instrument constructed according to this invention for predicting exposure effects and for deriving a correction factor to be applied to a basic exposure value. The instrument, which in this embodiment is directly associated with a camera shown diagrammatically at 11, comprises a viewfinder having casing 12 with an image transmission window 13 in one end and an eyepiece 14 at the other end. When held to the eye represented at 15, the instrument presents a field of view of limited angular extent for visual inspection. The angular extent of the field indicated between broken lines 16 preferably approximates the solid angle of the field of view imaged by the camera lens 21 on the photosensitive film 22 during exposure, so that the eye views the same scene toward which the camera 11 is directed.

Image light from the field of view thus presented to the eye passes through what may be termed an image transmission channel of the instrument. Within this image transmission channel is positioned a partially transparent screen constituted in this example by a half-silvered mirror 23 which intercepts an undivided portion of the total field of view. The partially silvered mirror 23 may be selectively illuminated over the back surface, i.e. the surface presented to the eye, for affecting the quality of the image presented for inspection. For this purpose an integrated light transmission channel is provided which derives from the field of view toward which the instrument is directed a substantially image-free quantity of luminous flux proportional to the integrated light intensity of the enire fieldt of view. The integrated light transmission channel incorporates in this embodiment a series of black-surfaced louvers 24 which limit the angular acceptance of light through the integrated light transmission channel incorporates in this embodisolid angle as that occupied by the field of view. The light accepted through this channel falls on a diffusing element 25 which may be of milk-glass or a frosted, but otherwise transparent, material whereupon it is directed by mirror 26 by reflection toward the back surface of the partially silvered mirror 23.

Forward of the louvers 24 in the light transmission channel there is provided means for selectively and adjustably attenuating the light admitted through the light transmission channel. Although the seletcive and adjustable attenuators may take many forms, in this particular embodiment a pair of relatively adjustable polarizing elements 27 and 28 are provided. Polarizer 27 may be fixed to admit light of a predetermined polarity while polarizer 28 may be selectively and adjustably rotated to vary the total quantity of light passed by both polarizers.

By this means the ratio of the luminous flux admitted by the image transmission channel to that admitted by the integrated light transmission channel may be selectively adjusted to affect the quality of the image presented for visual inspection.

The scene presented for visual inspection by this instrument appears to be veiled by a luminous field or haze. The haze, derived from the integrated luminance over the entire field of view, serves as a reference luminance for the measurement of highlights within the field of view. When the scene is viewed through this semi-transparent haze screen, only those areas in the view which are brighter than the reference haze by at least a significant difference are seen by the observer. Darker areas, in effect, disappear. In utilizing this effect, those highlight areas which may exceed the tonal range of the photosensitive emulsion to be exposed are clearly and dominantly perceived and thus sharply contrasted with other areas which may be satisfactorily reproduced on the photographic print. The instrument thus is capable of measuring the difference in brightness between the integrated reflected light and any highlight areas within the field of view.

It is to be noted that the instrument thus far described does not measure the absolute integrated luminance of the scene to be photographed. The instrument is not an exposure meter but has a different capability complementary to that of most exposure meters, since it measures the brightness difference between the integrated reflected light and any highlight area within the field of view. In its simpler forms, the instrument requires no adjustment for exposure factors as indicated by a typical photometer or for the speed of the emulsion employed. In this embodiment of the invention only a single control member 30, the adjustable mounting ring for polarizer 28, is employed. As seen in the partial front view of FIGURE 2 the mounting ring 30 may be calibrated in plus and minus exposure value units and read against an index symbol 31 on the side of casing 12. The correction factor derived from the instrument may also be defined in terms of shutter speed, $f$-stops, or any arbitrary but meaningful units.

Figure 2:
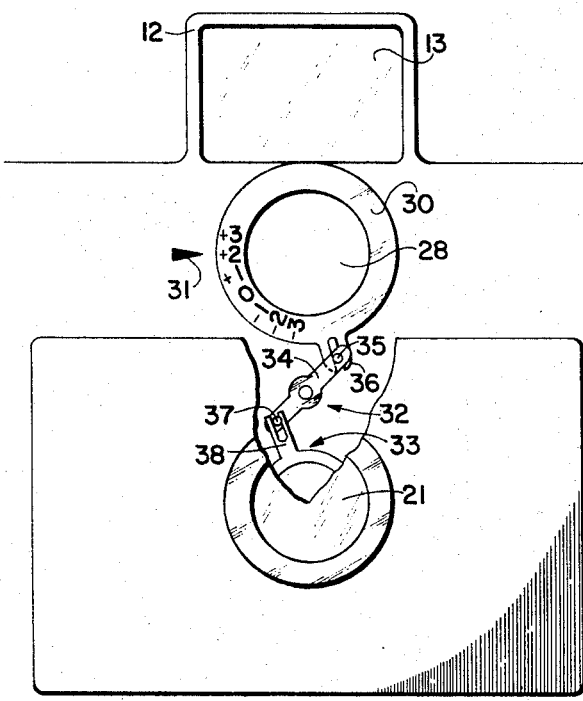
FIGURE 2 is a fragmentary front view, partially broken away, of the combination shown in FIGURE 1.

In addition to the scale from which the exposure correction factor may be read, the example illustrated in FIGURES 1 and 2 incorporates a coupling mechanism 32 for directly transferring the correction factor to a diaphragm mechanism 33 for trimming the exposure aperture of the camera. The coupling mechanism 32 is shown to include a pivotally mounted lever 34 each arm of which carries a crank extension. One extension 35 is engaged by a bifurcation 36 on the integrated light control member 30 whereas the other extension 37 slides within a similar bifurcation 38 on the trim diaphragm control member 39. Thus adjustments of control member 30 are directly translated into corresponding corrections of the photographic aperture.

It may be assumed that a basic exposure value has been determined and applied to the exposure control mechanism of the camera by any typical expedient. For example, assuming a fixed aperture, the selection of a particular shutter speed determines the basic exposure value before correction, a value which may not be valid for the correct exposure of psychologically significant areas of the scene to be photographed. Shutter speed selection may be accomplished manually or automatically in accordance with any known techniques ranging from the consulting of typical tables of brightness to the use of electronic shutters automatically responsive to scene brightness for controlling the duration of exposure. Since the selection of a basic uncorrected exposure value is not the subject of this invention, no particular shutter means are shown in the illustrations. With the basic exposure conditions established, the photographer examines the field of view as presented through the image transmission channel for inspection at eyepiece 14.

In observing the scene through the instrument the photographer can readily determine whether all those highlight areas in which gradation is desired would be overexposed or underexposed by the use of the basic exposure value. The quality of the image of the field of view presented to the photographer may be varied by adjusting the position of the control member 30 until psychologically significant highlights within the scene are just barely visible, being neither dominant nor totally obscured. The indicia on control member 30 then present a reading or corrosion factor by which the basic exposure value should be varied in order to produce an optimum exposure. In many photographic situations the correction factor required to produce an acceptable print will be zero. In others substantial correction may be necessary. The exposure correction value may be read off and applied to the exposure settings of the camera or coupled automatically by a mechanism such as that illustrated. It can thus be seen that the instrument is capable of eliminating guesswork from the determination of optimum exposures, while permitting accurate vernier-like adjustments to be made in exposure factors without the use of complex or expensive instruments of high physical precision.

Figure 3:
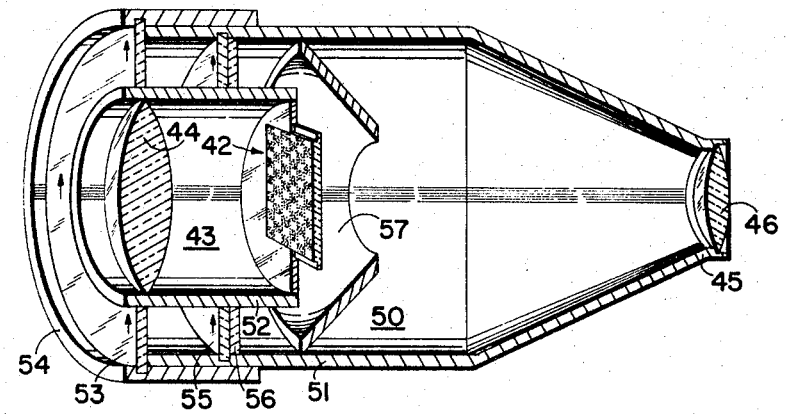
FIGURE 3 is a cross sectional perspective view of an alternate embodiment of the invention.

In FIGURE 3 is illustrated an alternate embodiment of the invention functioning on similar principles but producing a somewhat different quality in the image of the scene presented for visual inspection and analysis. In this embodiment is employed a partially transparent screen 42 constituted by a grid-like pattern of uniformly interpersed transparent and opaque but reflective spots, the sizes of the spots being exaggerated in this figure for illustrative purposes. The reflective spots are preferably mat white for maximum light reflectivity without the formation of new images. The screen 42 is supported within image transmission channel 43 at the focal point of field lens 44 of the instrument. Once again, the angular extent of the field represented by the image formed on grid 42 approximate the angle of image acceptance of a camera in connection with which the instrument may be employed. The image focused on the partially transparent screen 42 is presented for visual inspection through eyepiece 45 having a lens 46 capable of focusing the internal image for the benefit of the user.

An integrated light transmission channel 50 is provided for illuminating the back surface of screen 42 with light derived from the field of view imaged therein. For this purpose, an outer tube 51 surrounds casing 52 which houses the image transmission channel. Integrated light from the scene passes in sequence through a selectively rotatable polarizer 53 having a control member or ring 54 associated therewith for selectively adjusting the angle of polarity of the polarizer 53. The integrated light then passes through stationary polarizer 55 and a transmissive-diffusive element 56 to a conical reflector 57 which directs the light incident thereon onto the rear surface of the grid 42. The angle of acceptance of the image transmission channel is determined principally by the ratio between the width of transmission channel 50 and the depth of the diffusing element 56 within the channel. These ratios should preferably be selected to derive light from the same scene imaged on screen 42 by field lens 44.

An observer looking through eyepiece 45 thus sees a pattern or Gestalt fused within the scene under observation and constituting an undivided portion thereof. The user is able to make use of normal perceptual phenomena instantaneously to interpret the view or picture without conscious point-by-point analysis and synthesis.

When the adjustable polarizer 53 is set by control member 54 to provide a reference luminance on the back of grid 42 in accordance with the upper limit of useful gradation, all areas within the field under inspection which are bright enough to produce white tones in the final photographic print appear peppered with dark spots. Darker areas within the field of view appear covered with bright spots except those having an intermediate tonality. The spots interspersed in the intermediate tonality areas tend to disappear. In the use of the instrument normally no attempt is made to determine an instrument reading by the usual brightness matching technique employed in visual comparison photometry. Instead, the darkly spotted highlights are visualized by the user as white in the potential print and a judgment is made as to the suitably of the result. The control member is manipulated until the predicted effect is satisfactory. Normally the photographer in adjusting the control member 54 selectively attenuates the integrated reference light to affect the quality of the image presented in order to obtain only as much exposure compensation as is necessary to avoid either washed out significant highlights or the absence of any clear highlights at all. As in the previous example the exposure correction factor may be read off indicia associated with control member 54 or may be transferred automatically to an exposure control member on a camera.

A wide range of choices is available in the execution of this invention, only some of which choices can be described herein. The screen 42, for example, although illustrated as presenting a regular and repeatable pattern the size of which is exaggerated for purpose of illustration, may have any type of pattern or size or may even be randomized so that the user's attention favors the scene itself rather than the pattern of the reference spots visible on the scene. Indeed, the spots on the screen illuminated by the integrated light transmission channel may be so small that the user does not see them as discrete areas or spots, but instead as a luminous haze similar in quality to that produced in the first embodiment discussed above.

Figure 4:
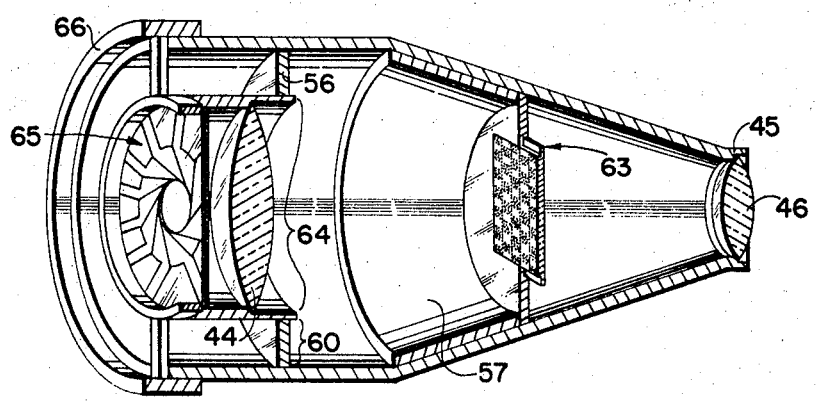
FIGURE 4 is a view similar to that of FIGURE 3 showing a still further embodiment.

Although in FIGURES 1 and 3 the integrated light directed onto the partially transparent screen is incident on the rear surface thereof, it may also be directed at the front surface in a manner such as that shown in FIGURE 4. In this figure, wherein elements similar to those of the FIGURE 3 embodiment are identified by the same reference numbers, the integrated light transmission channel 60 admits light through a transmissive-diffusive annular disc 62 to illuminate the front surface of the screen 63. Where the integrated light is incident on the front surface of the screen, as in this case, those areas of the screen which provide the reference luminance should be transmissive-diffusive instead of opaque and reflective.

In this example, as in the preceding one, the integrated light transmission channel 60 is constructed to accept light from approximately the same field of view which is imaged upon the partially transparent screen 63 by the field lens 44. At the forward end of the image transmission channel 64 is positioned a selectively adjustable light attenuator which in this embodiment is shown in the form of an adjustable iris diaphragm 65. Rotational adjustments of the calibrated control member 66 about the axis of the instrument vary the aperture of the diaphragm to control the luminous flux admitted from the field of view through the field lens 44. In this case the ratio of luminous flux admitted through the image transmission channel to that admitted through the integrated light transmission channel is varied by selectively attenuating the image light while keeping the integrated light fully responsive to screen luminance.

The image presented for visual inspection with this instrument is similar to that visible in the FIGURE 3 embodiment except for one difference. The difference is a result primarily of the nature of the partially transparent screen 63. Because those portions of screen 63 which are not completely transparent also receive and transmit image light components, though with some diffusion, the spots produced by the partially transparent screen are less distinct than in the immediately preceding example. Consequently, the quality of the image presented by this embodiment partakes of some of the visible characteristics of the embodiments shown both in FIGURE 1 and FIGURE 3.

Figure 5:
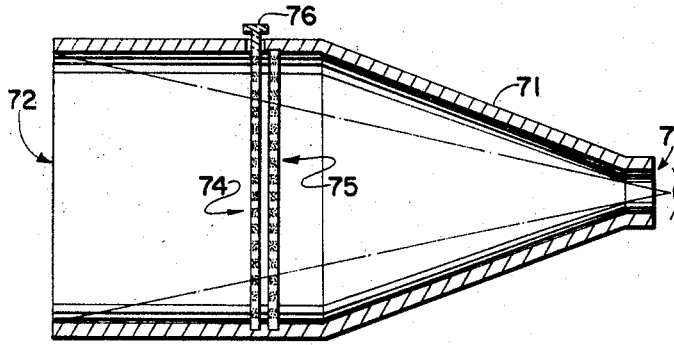
FIGURE 5 is a cross sectional view of a lensless embodiment of the invention.

In the embodiments thus far discussed, the image transmission channel is distinct and separate from the integrated light transmission channel up to the point of combination by the partially transparent screen within a single field of view. It is also possible in the practice of this invention for the two transmission channels to be coincident. In FIGURE 5 a simplified form of the invention employing no lenses or mirrors is shown in cross section. There the casing 71 provides an entrance window 72 and an eye aperture 73 for presenting a field of view of limited angular extent for visual inspection. Within the line of sight are positioned two patterned screen sections 74 and 75, the latter of which may be stationary. Screen section 74 is, however, rotatable with respect to screen section 75 and the degree of its rotation may be determined by the angular position of the control member 76 attached to screen section 74 and projecting through a slot in the side of the casing. Both screen sections 74 and 75 comprise alternate transparent and transmissive-diffusive areas arranged preferably as spiral bands side-by-side. When the two screen sections are in exact registry, the amount of image light passed by the two-part screen and viewed through eyepiece 73 is at a maximum. Angular displacement of screen section 74 from this position causes a variation in the ratio of image light and integrated luminance. When the two screens are completely out of registry, the integrated light viewed by the observer predominates over the image light.

Figure 6:
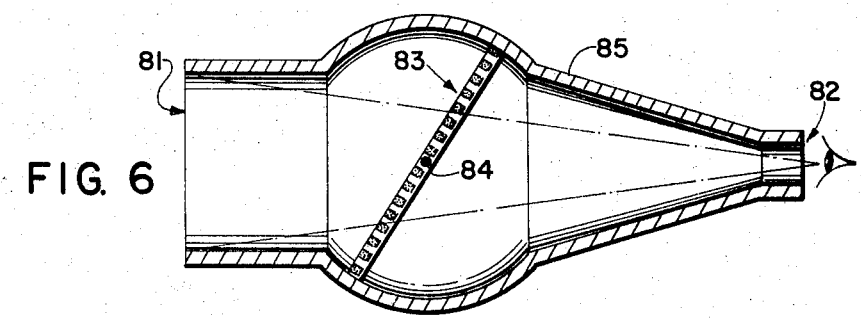
FIGURES 6, 7 and 8 are cross sectional views of three further lensless embodiments.

An alternate but related instrument for producing an effect similar to that of FIGURE 5 is shown in FIGURE 6. Herein, the admittance window 81 and the eye orifice 82 define the field of view of the instrument. Extending across and intercepting the light passing from admittance window 81 to the eyepiece 82 is a pivoted partially transparent screen 83 comprising a series of horizontal transmissive-diffusive lines somewhat similar to Ronchi rulings extending across the field of view and penetrating screen 83 to a significant depth. The lines need not be as fine as in a true diffraction grating. When the screen 83 is in a vertical position with respect to the longitudinal axis of the instrument, the maximum amount of image light from the scene is transmitted through the clear areas between the diffusive lines and presented for visual inspection through eyepiece 82. Angular displacements of the horizontally ruled screen 83, by causing the diffusive lines to intercept a greater proportion of the light, alter the ratio between the image light and the integrated light transmitted through the diffusive rulings of screen 83, thereby increasing the proportion of diffuse reference illumination viewed by the observer over the entire screen. A control member (not shown) attached to the partially transparent screen at its pivotal axis 84 and extending through the housing 85 may be used not only to manipulate the screen 83 but also, in cooperation with externally visible indicia, to derive the exposure correction factor.

Figure 7:
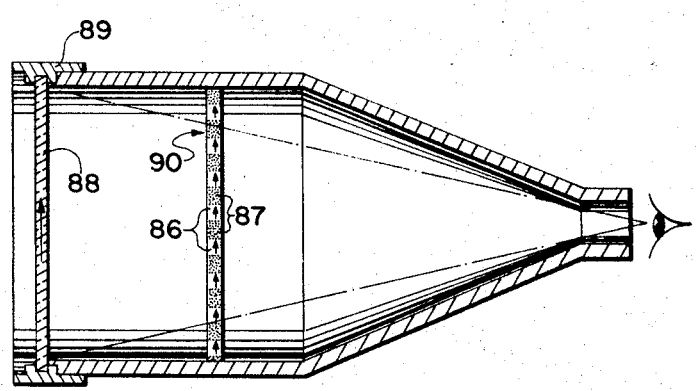

In FIGURE 7, the lensless instrument shown therein, is seen to comprise a partially transparent screen 90 comprising a patterned grid including alternate clear but polarizing areas 86 uniformly interspersed between transmissive-diffusive areas 87. A selectively rotatable polarizer element 88 controls all light which reaches screen 90. As the polarizer 88 is rotated by the control member 89 on which it is mounted, the amount of integrated light presented to the observer by transmissive-diffusive areas 87, remains constant, but the image of the scene viewable through polarized areas 86 is subjected to selectively variable attenuation. Adjustment of the polarizer 88 therefore controls the ratio of image light to integrated luminance presented to the eye of the observer. Once again the degree of adjustment may be represented on a scale associated with control member 89 and/or coupled to the exposure mechanism of a camera.

Figure 8:
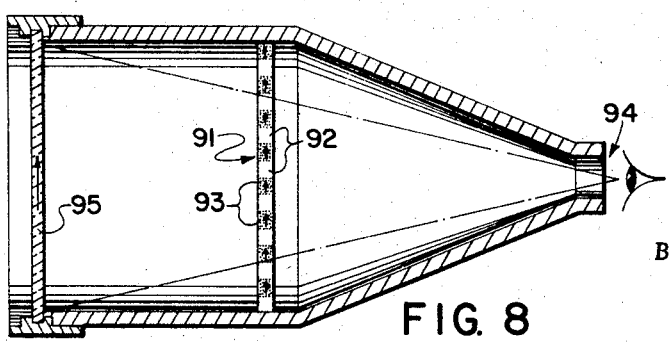

In FIGURE 8 is illustrated an alternate lensless embodiment in which the image light remains constant while the integrated light from the scene is attenuated. For this purpose, the partially transparent screen 91 comprises a grid-like pattern of clear areas 92 between which are uniformly interspersed areas 93 which are both polarizing and diffusing. Areas 93 therefore are visible to the eye of the observer at eyepiece 94 as an unfocused veil of illumination extending over the entire field of view. Adjustment of the angular orientation of the field polarizer 95 does not affect the image light of the scene presented to the eye through the clear areas 92 but selectively attenuates the integrated light passed by the polarizing and diffusive areas 93.

The invention described herein is capable of many more modifications than those particularly illustrated in the accompanying drawings. Those skilled in the art to which this invention pertains will recognize that the scope of the invention is not limited to these particular embodiments but extends to a wide variety of additional modifications which may be made. It has been mentioned above that the exposure correction factor determined in the use of an instrument constructed in accordance with these principles could, if desired, be coupled directly to a camera control member such as a diaphragm adjustment ring to transfer the correction factor to the camera automatically. Indeed the possible techniques which could be employed to transfer the correction factor to an exposure-determining mechanism on a camera are many. One type of photographic iris diaphragm employs two control rings each of which is independently movable with respect to the camera body for determining aperture. In the practice of this invention in combination with a camera equipped with such a diaphragm, one of the diaphragm control rings could be set in accordance with the basic uncorrected exposure value and the other control ring in accordance with the correction factor derived from an exposure value compensator of the type described. The correction factor could also be applied, if preferred, to the shutter speed control member either automatically or manually. In connection with an electronically timed shutter it is possible to employ the compensation factor to alter shutter speed by hastening or slowing the response of the timing circuit which controls the shutter.

The light attenuating means employed for varying the ratio between the luminous flux representing the image of the field of view and the luminous flux of the field of illumination imposed upon the image transmission channel may be of any well-known construction, and may include not only the iris diaphragms and polarizer combinations, but also optical wedges, louvers and the like. These may be employed either in connection with the image transmission channel or with the integrated light transmission channel or with both. When light attenuators are associated with both channels they should preferably be coupled to operate in opposite modes during adjustment such that the comparison illumination is increased when the image light is decreased and vice versa. Some will find it preferable in the use of such attenuators to selectively alter only the image light while keeping the average or integrated illumination fully responsive to average scene brightness.

It should be appreciated that any pattern carried by the partially transparent screen which intercepts the field of view will, if presented to the eye unfocused, appear as a diffuse field of light rather than a distinctly visible field pattern. When it is desired to present a distinct pattern superimposed upon the field of view, focusing lenses will ordinarily be necessary to present a focused image. For example, in an embodiment such as that illustrated in FIGURE 1, the comparison light may be presented to the eye as a pattern by the use of a light-transmissive pattern disposed adjacent the diffuser 25 and by introducing an additional lens between the pattern and the partially silvered mirror 23 to image the pattern to the eye of the observer.

In view of the many forms in which this invention may be embodied, it should be clear that the examples selected for description herein are illustrative in nature and not necessarily limiting. These embodiments as well as other variations and modifications which are within the true spirit and scope of the invention in its broader aspects are intended to be covered by the appended claims.

What is claimed is:
1. In combination:
 a photographic camera having means defining an exposure aperture for exposing a photosensitive surface to image light from a scene;
 a viewfinder including an image transmission channel for presenting and peripherally defining said scene for visual inspection;
 means responsive to the luminance from within the said periphery of said scene for imposing on the image transmission channel of said viewfinder a field of diffused illumination having a uniform intensity proportional to the integrated luminance emanating from within said scene periphery;
 means for adjusting the ratio of the luminous flux of said field of illumination to the luminous flux of image light from said scene in said image transmission channel to permit the analysis of luminance differences between significant portions of said scene and the integrated luminance thereof; and
 means controlled by said adjusting means for varying the amount of light passed by the exposure aperture of said camera during exposure.

2. An optical exposure value compensator comprising:
 an image transmission channel for presenting a field of view for visual inspection;
 means responsive to the luminance from within the periphery of said field of view for imposing on said image transmission channel a field of diffused illumination having a uniform intensity proportional to the integrated luminance emanating from within said periphery;
 means for adjusting the ratio between the luminous flux of said image transmission channel and that of said field of illumination to permit the analysis of luminance differences between selected portions of said field of view and the integrated luminance thereof; and
 means responsive to said adjusting means for deriving a correction factor for an exposure value applicable to said field of view.

3. The combination of claim 2 wherein said correction factor deriving means comprises relatively movable members bearing cooperative indicia for indicating said correction factor.

4. The combination of claim 2 wherein said correction factor deriving means comprises means for varying the amount of light admitted by an exposure aperture of a photographic camera during exposure.

5. An exposure value compensator comprising:
 a partially transparent image transmission screen;
 means responsive to light from a field of view having a limited angular extent for presenting said field of view for visual inspection through said screen and for illuminating said screen uniformly with diffused light of an intensity proportional to the integrated luminance of said field of view;
 means for adjusting the ratio of light illuminating said screen to the image light transmitted by said screen to affect the quality of the image of said field of view presented for visual inspection; and
 means responsive to said adjusting means for deriving a correction factor for an exposure value applicable to said field of view.

6. The combination of claim 5 in which said partially transparent screen includes transparent areas interpersed uniformly with transmissive-diffusive areas and in which the light illuminating said screen is incident on the side of the screen facing said field of view.

7. The combination of claim 5 in which said partially transparent screen is also partially reflective and in which the light illuminating said screen is incident on the side of the screen facing away from said field of view.

8. An instrument for use in predicting exposure effects comprising:
 an image transmission channel including means for presenting for visual inspection a field of view having a limited angular extent;
 a partially transparent screen interposed within said image transmission channel extending across the total angular extent of said field of view, said screen being uniformly illuminated with diffused light of an intensity proportional to the integrated luminance of said field of view;
 means for adjusting the ratio of light illuminating said screen to image light passed by said screen to alter the quality of the image presented for visual inspection; and
 means responsive to said adjusting means for deriving a correction factor for an exposure value applicable to said field of view.

9. The combination of claim 8 in which the partially transparent screen includes transparent areas interspersed uniformly with transmissive-diffusive areas and in which the light uniformly illuminating said screen enters the instrument through the image transmission channel and is incident on said screen on the side facing said field of view.

10. The combination of claim 8 in which the partially transparent screen includes transparent areas interspersed uniformly with transmissive-diffusive areas and in which the combination further comprises a separate integrated light transmission channel accepting light from the same field of view and directs integrated illumination onto the side of the screen facing said field of view.

11. The combination of claim 8 in which the partially transparent screen is also partially reflective and in which the combination further comprises a separate integrated light transmission channel accepting light from the same field of view and directs integrated illumination onto the side of the screen facing away from said field of view.

12. An instrument for use in predicting exposure effects comprising:
 an image transmission channel including means for presenting for visual inspection a field of view having a limited angular extent;

a partially transparent screen interposed within said image transmission channel to intercept an undivided portion of said field of view;

an integrated light transmission channel for illuminating said screen uniformly with diffused light of an intensity proportional to the integrated luminance of said field of view;

means for adjusting the ratio of light passed by said channels to affect the quality of the image presented for visual inspection; and means responsive to said adjusting means for deriving an exposure correction factor for said field of view.

13. An instrument for use in predicting exposure effects comprising:

an image transmission channel including means for presenting for visual inspection a field of view having a limited angular extent;

a partially transparent screen extending across the entire angular extent of said field of view, said screen comprising transparent image transmitting portions interspersed uniformly with light reflective portions;

an integrated light transmission channel responsive to integrated light derived from said field of view for illuminating the side of said screen facing away from said field of view with diffused light of uniform intensity derived from said field of view;

means for adjustably attenuating the light transmitted by at least one of said channels to vary the quality of the image of said field of view presented for visual inspection; and means responsive to said adjustable attenuating means for deriving an exposure correction factor for said field of view.

14. An instrument for use in predicting exposure effects comprising:

an image transmission channel including means for presenting for visual inspection a field of view having a limited angular extent;

a partially transparent screen extending across the entire angular extent of said field of view, said screen comprising transparent image transmitting portions interspersed uniformly with transmissive-diffusive portions;

an integrated light transmission channel responsive to diffused integrated light derived from said field of view for illuminating the side of said screen facing said field of view with light of uniform intensity derived from said field of view;

means for adjustably attenuating the light transmitted by at least one of said channels to vary the quality of the image of said field of view presented for visual inspection; and means responsive to said adjustable attenuating means for deriving an exposure correction factor for said field of view.

References Cited

UNITED STATES PATENTS

| 2,112,701 | 3/1938 | Leitz | 95—10 |
| 3,323,431 | 6/1967 | Land | 95—10 |

NORTON ANSHER, *Primary Examiner.*

R. A. SCHROEDER, *Assistant Examiner.*